United States Patent

[19]

Hiratani

[11] Patent Number: 5,811,502

[45] Date of Patent: Sep. 22, 1998

[54] OCULAR LENS MATERIAL

[75] Inventor: Haruyuki Hiratani, Kasugai, Japan

[73] Assignee: Menicon Co., Ltd., Nagoya, Japan

[21] Appl. No.: 965,435

[22] Filed: Nov. 6, 1997

[51] Int. Cl.$^6$ .................................................... C08F 20/10
[52] U.S. Cl. ............................................................ 526/318
[58] Field of Search .............................................. 526/318

[56] References Cited

FOREIGN PATENT DOCUMENTS

| 49-121886 | 11/1974 | Japan | 526/318 |
| 63-132913 | 6/1988 | Japan | 526/318 |

OTHER PUBLICATIONS

Answer 3 of 3, JP59048702–840321 by Suwa Seikosha pp. 14–15 in house computer search pp. 14–15.
Answer 1 of 1, CZ 95–315–950207 by Bleha–in–house computer search, pp. 16–17.

*Primary Examiner*—Joseph L. Schofer
*Assistant Examiner*—N. Sarofin
*Attorney, Agent, or Firm*—Oblon, Spivak, McClelland, Maier & Neustadt, P.C.

[57] ABSTRACT

An ocular lens material made of a polymer obtained by polymerizing polymerizable components comprising a monomer of the formula (I):

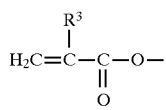

(I)

wherein $R^1$ is a group of the formula:

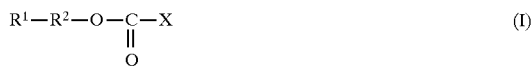

wherein $R^3$ is a hydrogen atom or a methyl group, or a group of the formula:

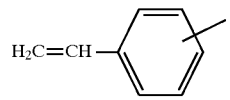

$R^2$ is a $C_{1-5}$ alkylene group, and X is a group of the formula

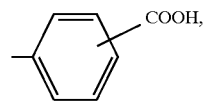

a group of the formula

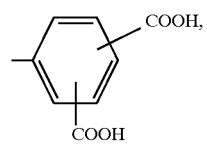

a group of the formula

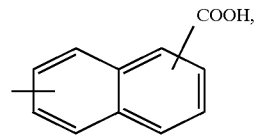

or a group of the formula

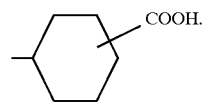

4 Claims, No Drawings

OCULAR LENS MATERIAL

The present invention relates to an ocular lens material. More particularly, it relates to an ocular lens material which is excellent in surface wettability and transparency and has a high refractive index and a relatively high hardness and which is thus useful for e.g. contact lenses, intraocular lenses or artificial cornea.

An ocular lens material to be used for ocular lenses such as contact lenses or intraocular lenses, is usually required to have excellent oxygen permeability, excellent transparency and proper hardness. Especially when a hard ocular lens having oxygen permeability is desired, it is common to employ a silicone-containing component in order to improve the oxygen permeability.

When such a silicone-containing component is used, it is certainly possible to obtain an ocular lens material excellent in oxygen permeability. However, such an ocular lens material has drawbacks that the hardness tends to be low, and the surface wettability (wettability to tears) tends to be poor. Accordingly, if a contact lens made of such an ocular lens material having poor surface wettability, is put on an eye, a dry feeling or a trouble such as a dry eye is likely to result.

The present invention has been made in view of such a prior art, and it is an object of the present invention to provide an ocular lens material which is excellent in surface wettability and transparency and has a high refractive index and which further has a relatively high hardness.

The present invention provides an ocular lens material made of a polymer obtained by polymerizing polymerizable components comprising a monomer of the formula (I):

$$R^1-R^2-O-\underset{\underset{O}{\|}}{C}-X \qquad (I)$$

wherein $R^1$ is a group of the formula:

wherein $R^3$ is a hydrogen atom or a methyl group, or a group of the formula:

$R^2$ is a $C_{1-5}$ alkylene group, and X is a group of the formula

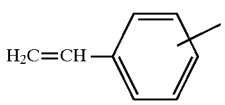

a group of the formula

a group of the formula

a group of the formula

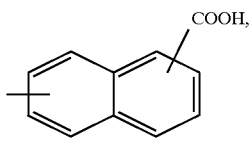

or a group of the formula

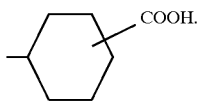

Now, the present invention will be described in detail with reference to the preferred embodiments.

As mentioned above, the ocular lens material of the present invention is made of a polymer obtained by polymerizing polymerizable components comprising a monomer (hereinafter referred to as monomer (A)) of the formula (I):

$$R^1-R^2-O-\underset{\underset{O}{\|}}{C}-X \qquad (I)$$

wherein $R^1$ is a group of the formula:

wherein $R^3$ is a hydrogen atom or a methyl group, or a group of the formula:

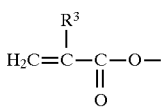

$R^2$ is a $C_{1-5}$ alkylene group, and X is a group of the formula

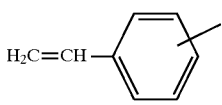

a group of the formula

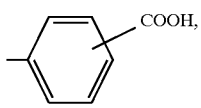

a group of the formula

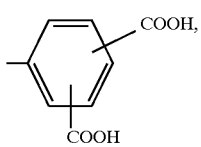

a group of the formula

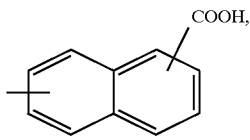

or a group of the formula

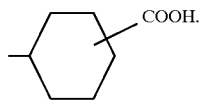

The above monomer (A) is a component which is capable of not only imparting excellent surface wettability to the resulting ocular lens material but also providing an ocular lens material excellent in transparency while maintaining a high refractive index and a relatively high hardness. Besides, when the monomer (A) is used in combination with a monomer (hereinafter referred to as monomer (B)) having an unsaturated double bond copolymerizable with the monomer (A), which will be described hereinafter, the monomer (A) exhibits good compatibility with various types of monomer (B), whereby the resulting ocular lens material is excellent in transparency.

Specific examples of the monomer (A) include, for example, 2-phthaloyloxymethyl methacrylate, 2-phthaloyloxyethyl methacrylate, 2-phthaloyloxypropyl methacrylate, 3-phthaloyloxymethyl methacrylate, 3-phthaloyloxyethyl methacrylate, 3-phthaloyloxypropyl methacrylate, 4-phthaloyloxymethyl methacrylate, 4-phthaloyloxyethyl methacrylate, 4-phthaloyloxypropyl methacrylate, 2-hexahydrophthaloyloxymethyl methacrylate, 2-hexahydrophthaloyloxyethyl methacrylate, 2-hexahydrophthaloyloxypropyl methacrylate, 3-hexahydrophthaloyloxymethyl methacrylate, 3-hexahydrophthaloyloxyethyl methacrylate, 3-hexahydrophthaloyloxypropyl methacrylate, 4-hexahydrophthaloyloxymethyl methacrylate, 4-hexahydrophthaloyloxyethyl methacrylate, 4-hexahydrophthaloyloxypropyl methacrylate, 2-phthaloyloxymethyl acrylate, 2-phthaloyloxyethyl acrylate, 2-phthaloyloxypropyl acrylate, 2-phthaloyloxymethyl acrylate, 2-phthaloyloxyethyl acrylate, 2-phthaloyloxypropyl acrylate, 4-phthaloyloxymethyl acrylate, 4-phthaloyloxyethyl acrylate, 4-phthaloyloxypropyl acrylate, 2-hexahydrophthaloyloxymethyl acrylate, 2-hexahydrophthaloyloxyethyl acrylate, 2-hexahydrophthaloyloxypropyl acrylate, 3-hexahydrophthaloyloxymethyl acrylate, 3-hexahydrophthaloyloxyethyl acrylate, 3-hexahydrophthaloyloxypropyl acrylate, 4-hexahydrophthaloyloxymethyl acrylate, 4-hexahydrophthaloyloxyethyl acrylate, 4-hexahydrophthaloyloxypropyl acrylate, 4-methacryloyloxymethyl trimellitic acid, 4-methacryloyloxyethyl trimellitic acid, 4-methacryloyloxypropyl trimellitic acid, 4-acryloyloxymethyl trimellitic acid, 4-acryloyloxyethyl trimellitic acid, 4-acryloyloxypropyl trimellitic acid, 2-phthaloyloxymethylstyrene, 2-hexahydrophthaloyloxymethylstyrene, 7-methacryloyloxymethylnaphthoic acid, 7-methacryloyloxyethylnaphthoic acid, and 7-methacryloyloxypropylnaphthoic acid. These monomers may be used alone or in combination as a mixture of two or more of them. Among them, 2-phthaloyloxyethyl methacrylate of the formula:

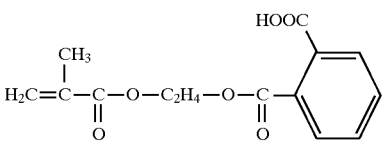

and 2-hexahydrophthaloyloxyethyl methacrylate of the formula

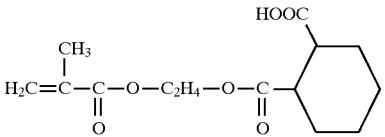

are preferred from the viewpoint that they are capable of effectively imparting excellent transparency and surface wettability as well as a relatively high refractive index, to the ocular lens material.

The amount of the monomer (A) is preferably at least 3 wt %, more preferably from 5 to 99 wt %, of the polymerizable components, in order to adequately obtain the effect for imparting surface wettability by the use of such monomer (A).

The ocular lens material of the present invention may be composed, in its entire amount or in its major amount, of a polymer obtained by polymerizing a polymerizable component consisting of the above monomer (A). However, in the present invention, it is possible to employ polymerizable components containing the above-mentioned monomer (B) together with the monomer (A), so long as the purpose of the present invention will not be hindered.

The above monomer (B) may suitably be selected depending upon the nature of the desired ocular lens material and may be used by properly adjusting its amount so that the total amount of polymerizable components will be 100 wt %, preferably within a range of at most 97 wt %, more preferably within a range of from 1 to 95 wt %, of the polymerizable components. For example, when a non-water absorptive ocular lens material is desired, a hydrophobic monomer or macromonomer may be mainly selected for use, and when a water-absorptive ocular lens is desired, a hydrophilic monomer or macromonomer may be mainly selected for use. Likewise, when an ocular lens material excellent in mechanical strength is desired, a reinforcing monomer or macromonomer may be selected for use, and when an ocular lens material excellent in water resistance or solvent resistance is desired, a crosslinkable monomer may be selected for use to form a crosslinked structure.

Specifically, for example, in a case where it is desired to impart oxygen permeability to the resulting ocular lens material and at the same time to reinforce the mechanical strength of the ocular lens material, a polysiloxane macromonomer, such as a polysiloxane macromonomer having a polymerizable group bonded to the siloxane main chain via one or two urethane bonds, a polysiloxane macromonomer having a polymerizable group bonded directly to the siloxane main chain or a polysiloxane macromonomer having a polymerizable group bonded to the siloxane main chain via an alkylene group, may be used as the monomer (B).

Such a polysiloxane macromonomer may, for example, be a macromonomer of the formula (II):

$$A^1\text{-}(U^2)_{m2}\text{-}S^3\text{-}(T^4)_{m4}\text{-}(U^5)_{m5}\text{-}A^6 \tag{II}$$

wherein $A^1$ is a group of the formula:

$Y^{11}\text{-}R^{12}-$ wherein $Y^{11}$ is an acryloyloxy group, a methacryloyloxy group, a vinyl group or an allyl group, and $R^{12}$ is a $C_{1-6}$ linear or branched alkylene group;

$A^6$ is a group of the formula:

$-R^{62}\text{-}Y^{61}$ wherein $R^{62}$ is a $C_{1-6}$ linear or branched alkylene group, and $Y^{61}$ is an acryloyloxy group, a methacryloyloxy group, a vinyl group or an allyl group;

$U^2$ is a group of the formula:

$-X^{21}\text{-}E^{22}\text{-}X^{23}\text{-}R^{24}-$ wherein $X^{21}$ is a covalent bond, an oxygen atom or a $C_{1-6}$ alkylene glycol group, $E^{22}$ is a -NHCO- group or a bivalent group wherein the terminals derived from a diisocyanate selected from a saturated aliphatic type, an alicyclic type and an aromatic type, are a -CONH- group and a -NHCO- group, $X^{23}$ is an oxygen atom, a $C_{1-6}$ alkylene glycol group or a group of the formula:

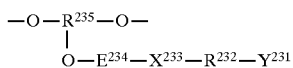

wherein $R^{235}$ is a $C_{1-6}$ trivalent hydrocarbon group, $R^{232}$ is a $C_{1-6}$ linear or branched alkylene group, $E^{234}$ is a -CONH- group or a bivalent group wherein the terminals derived from a diisocyanate selected from a saturated aliphatic type, an alicyclic type and an aromatic type, are a -CONH- group and a -NHCO- group, $X^{233}$ is a covalent bond, an oxygen atom or a $C_{1-6}$ alkylene glycol group, and $Y^{231}$ is an acryloyloxy group, a methacryloyloxy group, a vinyl group or an allyl group, provided that $X^{233}$ is a covalent bond when the adjacent $E^{234}$ is a -CONH- group, or an oxygen atom or a $C_{1-6}$ alkylene glycol group when the adjacent $E^{234}$ is a bivalent group derived from the isocyanate, and $E^{234}$ forms a urethane bond between the adjacent oxygen atom and $X^{233}$, and $R^{24}$ is a $C_{1-6}$ linear or branched alkylene group, provided that $X^{21}$ is a covalent bond when the adjacent $E^{22}$ is a -NHCO- group, or an oxygen atom or a $C_{1-6}$ alkylene glycol group when the adjacent $E^{22}$ is the bivalent group derived from the diisocyanate, and $E^{22}$ forms a urethane bond between the adjacent $E^{21}$ and $X^{23}$;

$U^5$ is a group of the formula:

$-R^{54}\text{-}X^{53}\text{-}E^{52}\text{-}X^{51}-$ wherein $R^{54}$ is a $C_{1-6}$ linear or branched alkylene group, $X^{53}$ is an oxygen atom, a $C_{1-6}$ alkylene glycol group or a group of the formula:

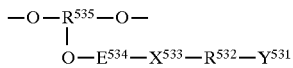

wherein $R^{535}$ is a $C_{1-6}$ trivalent hydrocarbon group, $R^{532}$ is a $C_{1-6}$ linear or branched alkylene group, $E^{534}$ is a -CONH- group or a bivalent group wherein the terminals derived from a diisocyanate selected from a saturated aliphatic type, an alicyclic type and an aromatic type, are a -CONH- group and a -NHCO- group, $X^{533}$ is a covalent bond, an oxygen atom or a $C_{1-6}$ alkylene glycol group, $Y^{531}$ is an acryloyloxy group, a methacryloyloxy group, a vinyl group or an allyl group, provided that $X^{533}$ is a covalent bond when the adjacent $E^{534}$ is a -CONH- group, or an oxygen atom or a $C_{1-6}$ alkylene glycol group when the adjacent $E^{534}$ is a bivalent group derived from the the diisocyanate, and $E^{534}$ forms a urethane bond between the adjacent oxygen atom and $X^{533}$, $E^{52}$ is a -CONH- group or a bivalent group wherein the terminals derived from a diisocyanate selected from an unsaturated aliphatic type, an alicyclic type and an aromatic type, are a -CONH- group and a -NHCO- group, and $X^{51}$ is a covalent bond, an oxygen atom or a $C_{1-6}$ alkylene glycol group, provided that $X^{51}$ is a covalent bond when the adjacent $E^{52}$ is a -CONH- group, or an oxygen atom or a $C_{1-6}$ alkylene glycol group when the adjacent $E^{52}$ is a bivalent group derived from the diisocyanate, and $E^{52}$ forms a urethane bond between the adjacent $X^{51}$ and $E^{53}$;

$S^3$ is a group of the formula:

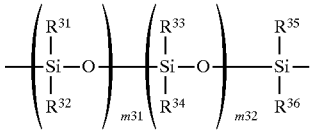

wherein each of $R^{31}$, $R^{32}$, $R^{33}$, $R^{35}$ and $R^{36}$ which are independent of one another, is a $C_{1-6}$ linear or branched alkyl group, of which some or all of hydrogen atoms may be substituted by fluorine atoms, or a phenyl group, $R^{34}$ is a $C_{1-6}$ linear or branched alkyl group, of which some or all of hydrogen atoms may be substituted by fluorine atoms, a phenyl group or a group of the formula:

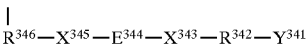

wherein each of $R^{346}$ and $R^{342}$ which are independent of each other, is a $C_{1-6}$ linear or branched alkylene group, each of $X^{345}$ and $X^{343}$ is a covalent bond, an oxygen atom or a $C_{1-6}$ alkylene glycol group, $E^{344}$ is a -CONH- group or a bivalent group wherein the terminals derived from a diisocyanate selected from a saturated aliphatic type, an alicyclic type and an aromatic type, are a -CONH- group and a -NHCO- group, and $Y^{341}$ is an acryloyloxy group, a methacryloyloxy group, a vinyl group or an allyl group, provided that each of $X^{345}$ and $X^{343}$ is a covalent bond when the adjacent $E^{344}$ is a -CONH- group, or an oxygen atom or a $C_{1-6}$ alkylene glycol group when the adjacent $E^{344}$ is a bivalent group derived from the diisocyanate, and $E^{344}$ forms a urethane bond between the adjacent $X^{345}$ and $X^{343}$; provided that a case where all of $R^{31}$, $R^{32}$, $R^{33}$, $R^{34}$, $R^{35}$ and $R^{36}$ are simultaneously $C_{1-6}$ linear or branched alkyl groups wherein some or all of hydrogen atoms are substituted by fluorine atoms, or phenyl groups, is excluded, m31 is an integer of from 1 to 100, m32 is an integer of from 0 to (100-(m31)), provided that (m31)+(m32) is an integer of from 1 to 100; and $T^4$ is a group of the formula:

$-U^{41}\text{-}S^{42}-$ wherein $U^{41}$ is a group of the formula:

$-R^{411}\text{-}X^{412}\text{-}E^{413}\text{-}X^{414}\text{-}R^{415}-$ wherein each of $R^{411}$ and $R^{415}$ which are independent of each other, is a $C_{1-6}$ linear or branched alkylene group, each of $X^{412}$ and $X^{414}$ which are independent of each other, is an oxygen atom or a $C_{1-6}$ alkylene glycol group, and $E^{413}$ is a bivalent group wherein the terminals derived from a diisocyanate selected from a saturated aliphatic type, an alicyclic type and an aromatic type, are a -CONH- group and a -NHCO- group, provided that $E^{413}$ forms a urethane bond between the adjacent $X^{412}$ and $X^{414}$, and $S^{42}$ is a group of the formula:

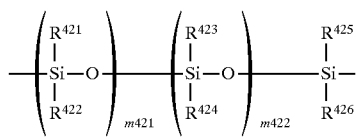

wherein each of $R^{421}$, $R^{422}$, $R^{423}$, $R^{425}$ and $R^{426}$ which are independent of one another, is a $C_{1-6}$ linear or branched alkyl group wherein some or all of hydrogen atoms may be substituted by fluorine atoms, or a phenyl group, $R^{424}$ is a $C_{1-6}$ linear or branched alkyl group wherein some or all of hydrogen atoms may be substituted by fluorine atoms, a phenyl group or a group of the formula:

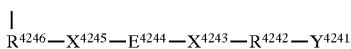

wherein each of $R^{4246}$ and $R^{4242}$ which are independent of each other, is a $C_{1-6}$ linear or branched alkylene group, each of $X^{4245}$ and $X^{4243}$ is a covalent bond, an oxygen atom or a $C_{1-6}$ alkylene glycol group, $E^{4244}$ is a -CONH- group or a bivalent group wherein the terminals derived from a diisocyanate selected from a saturated aliphatic type, an alicyclic type and an aromatic type, are a -CONH- group and a -NHCO- group, and $Y^{4241}$ is an acryloyloxy group, a methacryloyloxy group, a vinyl group or an allyl group, provided that each of $X^{4245}$ and $X^{4243}$ is a covalent bond when the adjacent $E^{4244}$ is a -CONH- group, or an oxygen atom or a $C_{1-6}$ alkylene glycol group when the adjacent $E^{4244}$ is a bivalent group derived from the diisocyanate, and $E^{4244}$ forms a urethane bond between the adjacent $X^{4245}$ and $X^{4243}$, provided that a case wherein all of $R^{421}$, $R^{422}$, $R^{423}$, $R^{424}$, $R^{425}$ and $R^{426}$ are simultaneously $C_{1-6}$ linear or branched alkyl groups wherein some or all of hydrogen atoms are substituted by fluorine atoms, or phenyl groups, is excluded, m421 is an integer of from 1 to 100, and m422 is an integer of from 0 to (100-(m421), provided that (m421)+(m422) is an integer of from 1 to 100, or a group of the formula:

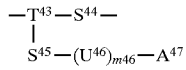

wherein $T^{43}$ is a group of the formula:

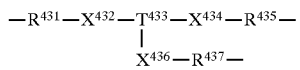

wherein each of $R^{431}$, $R^{435}$ and $R^{437}$ which are independent of one another, is a $C_{1-6}$ linear or branched alkylene group, each of $X^{432}$, $X^{434}$ and $X^{436}$ which are independent of one another, is an oxygen atom or a $C_{1-6}$ alkylene glycol group, and $T^{433}$ is a group of the formula:

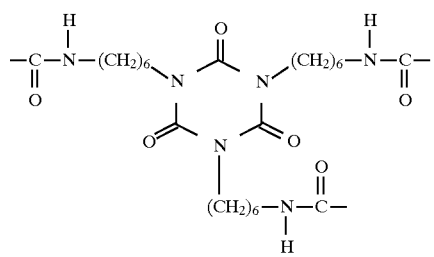

provided that it forms a urethane bond among the adjacent $X^{432}$, $X^{434}$ and $X^{436}$, $S^{44}$ is a group of the formula:

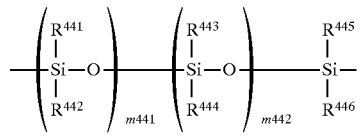

wherein each of $R^{441}$, $R^{442}$, $R^{443}$, $R^{445}$ and $R^{446}$ which are independent of one another is a $C_{1-6}$ linear or branched alkyl group wherein some or all of hydrogen atoms may be substituted by fluorine atoms, or a phenyl group, $R^{444}$ is a $C_{1-6}$ linear or branched alkyl group wherein some or all of hydrogen atoms may be substituted by fluorine atoms, a phenyl group or a group of the formula:

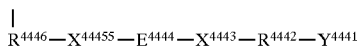

wherein each of $R^{4446}$ and $R^{4442}$ which are independent of each other, is a $C_{1-6}$ linear or branched alkylene group, each of $X^{4445}$ and $X^{4443}$ is a covalent bond, an oxygen atom or a $C_{1-6}$ alkylene glycol group, $E^{4444}$ is a -CONH- group or a bivalent group wherein the terminals derived from a diisocyanate selected from a saturated aliphatic type, an alicyclic type and an aromatic type, are a -CONH- group and a -NHCO- group, and $Y^{4441}$ is an acryloyloxy group, a methacryloyloxy group, a vinyl group or an allyl group, provided that each of $X^{4445}$ and $X^{4443}$ is a covalent bond when the adjacent $E^{4444}$ is a -CONH- group, or an oxygen atom or a $C_{1-6}$ alkylene glycol group when the adjacent $E^{4444}$ is a bivalent group derived from the isocyanate, and $E^{4444}$ forms a urethane bond between the adjacent $X^{4445}$ and $X^{4443}$, provided that a case wherein all of $R^{441}$, $R^{442}$, $R^{443}$, $R^{444}$, $R^{445}$ and $R^{446}$ are simultaneously $C_{1-6}$ linear or branched alkyl groups wherein some or all of hydrogen atoms are substituted by fluorine atoms, or phenyl groups, is excluded, m441 is an integer of from 1 to 100, and m442 is an integer of from 0 to (100-(m441), provided that (m441)+(m442) is an integer of from 1 to 100, $S^{45}$ is a group of the formula:

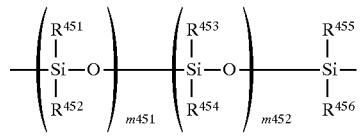

wherein each of $R^{451}$, $R^{452}$, $R^{453}$, $R^{455}$ and $R^{456}$ which are independent of one another, is a $C_{1-6}$ linear or branched alkyl group wherein some or all of hydrogen atoms may be substituted by fluorine atoms, or a phenyl group, $R^{454}$ is a $C_{1-6}$ linear branched alkyl group wherein some or all of hydrogen atoms may be substituted by fluorine atoms, a phenyl group or a group of the formula:

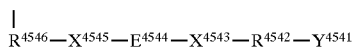

wherein each of $R^{4546}$ and $R^{4542}$ which are independent of each other, is a $C_{1-6}$ linear branched alkylene group, each of $X^{4545}$ and $X^{4543}$ is a covalent bond, an oxygen atom or a $C_{1-6}$ alkylene glycol group, $E^{4544}$ is a -CONH- group or a bivalent group wherein the terminals derived from a diisocyanate selected from a saturated aliphatic type, an alicyclic type and an aromatic type, are a -CONH- group and a -NHCO- group, $Y^{4541}$ is an acryloyloxy group, a methacryloyloxy group, a vinyl group or an allyl group, provided that each of $X^{4545}$ and $X^{4543}$ is a covalent bond when the adjacent $E^{4544}$ is a -CONH- group, or an oxygen atom or a $C_{1-6}$ alkylene glycol group when the adjacent $E^{4544}$ is a bivalent group derived from the diisocyanate, and $E^{4544}$ forms a urethane bond between the adjacent $X^{4545}$ and $X^{4543}$, provided that a case wherein all of $R^{451}$, $R^{452}$, $R^{453}$, $R^{454}$, $R^{455}$ and $R^{456}$ are simultaneously $C_{1-6}$ linear or branched alkyl groups wherein some or all of hydrogen atoms are substituted by fluorine atoms, or phenyl groups, is excluded, m451 is an integer of from 1 to 100, and m452 is an integer of from 0 to (100-(m451), provided that (m451)+(m452) is an integer of from 1 to 100, $U^{46}$ is a group of the formula:

wherein $R^{461}$ is a $C_{1-6}$ linear or branched alkylene group, $X^{462}$ is an oxygen atom, a $C_{1-6}$ alkylene glycol group or a group of the formula:

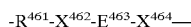

wherein $R^{4625}$ is a $C_{1-6}$ trivalent hydrocarbon group, $R^{4622}$ is a $C_{1-6}$ linear or branched alkylene group, $E^{4624}$ is a -CONH- group or a bivalent group wherein the terminals derived from a diisocyanate selected from a saturated aliphatic type, an alicyclic type and an aromatic type, are a -CONH- group and a -NHCO- group, $X^{4623}$ is a covalent bond, an oxygen atom or a $C_{1-6}$ alkylene glycol group, and $Y^{4621}$ is an acryloyloxy group, a methacryloyloxy group, a vinyl group or an allyl group, provided that $X^{4623}$ is a covalent bond when the adjacent $E^{4624}$ is a -CONH- group, or an oxygen atom or a $C_{1-6}$ alkylene glycol group when the adjacent $E^{4624}$ is a bivalent group derived from the isocyanate, and $E^{4624}$ forms a urethane bond between the adjacent oxygen atom and $X^{4623}$, $E^{463}$ is a -CONH- group or a bivalent group wherein the terminals derived from a diisocyanate selected from a saturated aliphatic type, an alicyclic type and an aromatic type, are a -CONH- group and a -NHCO- group, $X^{464}$ is a covalent bond, an oxygen atom or a $C_{1-6}$ alkylene glycol group, provided that $X^{464}$ is a covalent bond when the adjacent $E^{463}$ is a -CONH- group, or an oxygen atom or a $C_{1-6}$ alkylene glycol group when the adjacent $E^{463}$ is a bivalent group derived from the diisocyanate, and $E^{463}$ forms a urethane bond between the adjacent $X^{462}$ and $X^{464}$, and $A^{47}$ is a group of the formula:

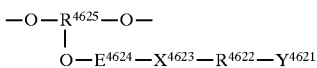

wherein $R^{472}$ is a $C_{1-6}$ linear or branched alkylene group, and $Y^{471}$ is an acryloyloxy group, a methacryloyloxy group, a vinyl group or an allyl group, and m46 is 0 or 1, m2 is 0 or 1, m4 is 0, 1, 2 or 3, and m5 is 0 or 1, provided that m2, m5 and m46 are all the same; such as a urethane bond-containing polysiloxane macromonomer (hereinafter referred to as macromonomer a) of the formula:

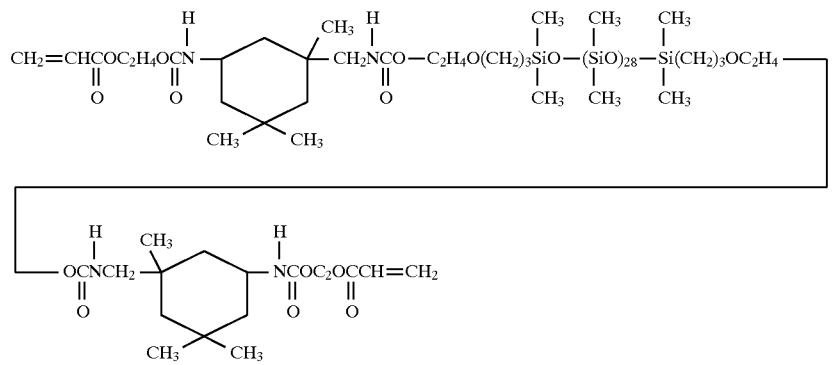

Such polysiloxane macromonomers may be used alone or in combination as a mixture of two or more of them. The amount of such a polysiloxane macromonomer may be suitably adjusted depending upon the nature of the desired ocular lens material.

For example, when it is desired to improve the oxygen permeability of the resulting ocular lens material, a silicon-containing monomer such as a silicon-containing alkyl (meth)acrylate, a silicon-containing styrene derivative or an alkylvinyl silane, may be employed as the monomer (B).

The silicon-containing alkyl (meth)acrylate may, for example, be an organopolysiloxane-containing alkyl (meth) acrylate, such as pentamethyldisiloxanylmethyl (meth) acrylate, trimethylsiloxydimethylsilylpropyl (meth)acrylate, methylbis(trimethylsiloxy)silylpropyl (meth)acrylate, tris (trimethylsiloxy)silylpropyl (meth)acrylate, mono [methylbis(trimethylsiloxy)siloxy]bis(trimethyl siloxy) silylpropyl (meth)acrylate, tris[methylbis(trimethylsiloxy) siloxy]silylpropyl (meth)acrylate, methyl[bis (trimethylsiloxy)]silylpropylglyceryl (meth)acrylate, tris (trimethylsiloxy)silylpropylglyceryl (meth)acrylate, mono [methylbis(trimethylsiloxy)siloxy]bis(trimethyl siloxy) silylpropylglyceryl (meth)acrylate, trimethylsilylethyltetramethyldisiloxanylpropylglyceryl (meth)acrylate, trimethylsilylmethyl (meth)acrylate, trimethylsilylpropyl (meth)acrylate, trimethylsilylpropylglyceryl (meth)acrylate, pentamethyldisiloxanylpropylglyceryl (meth)acrylate, methylbis(trimethylsiloxy) silylethyltetramethyl disiloxanylmethyl (meth)acrylate, tetramethyltriisopropylcyclotetrasiloxanylpropyl (meth)

acrylate, tetramethyltriisopropylcyclotetrasiloxybis(trimethyl siloxy)silylpropyl (meth)acrylate or trimethylsiloxydimethylsilylpropyl (meth)acrylate.

The above silicon-containing styrene derivative may, for example, be silicon-containing styrene derivative of the formula (III):

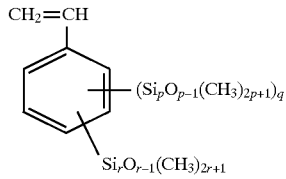

wherein p is an integer of from 1 to 15, q is 0 or 1, and r is an integer of from 1 to 15. In the silicon-containing styrene derivative of the formula (III), if p or r is an integer of 16 or higher, the synthesis or purification tends to be difficult, and the hardness of the resulting ocular lens material tends to be low. Further, if q is an integer of 2 or higher, the synthesis of such a silicon-containing styrene derivative tends to be difficult.

Typical examples of the silicon-containing styrene derivative of the above formula (III) include tris(trimethylsiloxy)silyl styrene, bis(trimethylsiloxy)methylsilyl styrene, dimethylsilyl styrene, trimethylsilyl styrene, tris(trimethylsiloxy)siloxanyldimethylsilyl styrene, [bis(trimethylsiloxy)methylsiloxanyl]dimethylsilyl styrene, pentamethyldisiloxanyl styrene, heptamethyltrisiloxanyl styrene, nonamethyltetrasiloxanyl styrene, pentadecamethylheptasiloxanyl styrene, heneicosamethyldecasiloxanyl styrene, heptacosamethyltridecasiloxanyl styrene, hentriacontamethylpentadecasiloxanyl styrene, trimethylsiloxypentamethyldisiloxymethylsilyl styrene, tris(pentamethyldisiloxy)silyl styrene, (tristrimethylsiloxy)siloxanylbis(trimethylsiloxy)silyl styrene, bis(heptamethyltrisiloxy)methylsilyl styrene, tris(methylbistrimethylsiloxysiloxy)silyl styrene, trimethylsiloxybis(tristrimethylsiloxysiloxy)silyl styrene, heptakis(trimethylsiloxy)trisiloxanyl styrene, tris(tristrimethylsiloxysiloxy)silyl styrene, (tristrimethylsiloxyhexamethyl)tetrasiloxy(tristrimethylsiloxy)siloxytrimethylsiloxysilyl styrene, nonakis(trimethylsiloxy)tetrasiloxanyl styrene, bis(tridecamethylhexasiloxy)methylsilyl styrene, heptamethylcyclotetrasiloxanyl styrene, heptamethylcyclotetrasiloxybis(trimethylsiloxy)silyl styrene, and tripropyltetramethylcyclotetrasiloxanyl styrene.

The above alkylvinyl silane may, for example, be trimethylvinyl silane.

Among the above silicon-containing monomers, tris(trimethylsiloxy)silylpropyl (meth)acrylate and tris(trimethylsiloxy)silyl styrene are particularly preferred, since they are excellent in the compatibility with other polymerizable components, and they have large effects for improving the oxygen permeability of the resulting ocular lens material.

Such silicon-containing monomers may be used alone or in combination as a mixture of two or more of them. The amount of such a silicon-containing monomer may suitably be adjusted depending upon the nature of the desired ocular lens material.

When it is desired to improve the hydrophilic property of the resulting ocular lens material and to impart water absorptivity to the ocular lens material, a hydrophilic monomer having a hydroxyl group, an amide group, a carboxyl group, an amino group, a glycol residue, a pyrrolidone structure or a morpholine structure, may, for example, be used as the monomer (B).

The above hydrophilic monomer may, for example, be a hydroxyalkyl (meth)acrylate such as 2-hydroxyethyl (meth)acrylate, hydroxybutyl (meth)acrylate or hydroxypropyl (meth)acrylate; an (alkyl)aminoalkyl (meth)acrylate such as 2-dimethylaminoethyl (meth)acrylate or 2-butylaminoethyl (meth)acrylate; an alkyl (meth)acrylamide such as N,N-dimethyl (meth)acrylamide; a polyglycol mono(meth)acrylate such as propylene glycol mono(meth)acrylate; vinyl pyrrolidone; (meth)acrylic acid; maleic anhydride; fumaric acid; a fumaric acid derivative; amino styrene; or hydroxy styrene.

Among the above hydrophilic monomers, an alkyl (meth)acryloamide, (meth)acrylic acid and a hydroxyalkyl (meth)acrylate are particularly preferred, since they are excellent in the compatibility with other polymerizable components, and they have large effects for improving the hydrophilic property of the resulting ocular lens material.

The above hydrophilic monomers may be used alone or in combination as a mixture of two or more of them. The amount of such a hydrophilic monomer may suitably be adjusted depending upon the nature of the desired ocular lens material.

Further, when it is desired to improve the mechanical strength or durability of the resulting ocular lens material and to impart water resistance and solvent resistance to the ocular lens material, it is preferred to employ a crosslinkable monomer which is a polyfunctional polymerizable compound having at least two copolymerizable unsaturated double bonds as the monomer (B).

Such a crosslinkable monomer may, for example, be ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, methacryloyloxyethyl acrylate, divinylbenzene, diallyl phthalate, diallyl adipate, triallyl isocyanurate, α-methylene-N-vinylpyrrolidone, 4-vinylbenzyl (meth)acrylate, 3-vinylbenzyl (meth)acrylate, 2,2-bis (p-(meth)acryloyloxyphenyl)hexafluoropropane, 2,2-bis(m-(meth)acryloyloxyphenyl)hexafluoropropane, 2,2-bis(o-(meth)acryloyloxyphenyl)hexafluoropropane, 2,2-bis(p-(meth)acryloyloxyphenyl)propane, 2,2-bis(m-(meth)acryloyloxyphenyl)propane, 2,2-bis(o-(meth)acryloyloxyphenyl)propane, 1,4-bis(2-(meth)acryloyloxyhexafluoroisopropyl)benzene, 1,3-bis(2-(meth)acryloyloxyhexafluoroisopropyl)benzene, 1,2-bis(2-(meth)acryloyloxyhexafluoroisopropyl)benzene, 1,4-bis(2-(meth)acryloyloxyisopropyl)benzene, 1,3-bis(2-(meth)acryloyloxyisopropyl)benzene, or 1,2-bis(2-(meth)acryloyloxyisopropyl)benzene.

Among the above crosslinkable monomers, ethylene glycol di(meth)acrylate is particularly preferred, since it is excellent in the compatibility with other polymerizable components, and it has large effects for improving the mechanical strength of the resulting ocular lens material.

The above crosslinkable monomers may be used alone or in combination as a mixture of two or more of them. The amount of such a crosslinkable monomer may be suitably adjusted depending upon the nature of the desired ocular lens material.

Further, when it is desired to impart deposit resistance to the resulting ocular lens material, it is preferred to employ a fluorine-containing monomer which is a polymerizable compound having some of hydrogen atoms of a hydrocarbon group substituted by fluorine atoms, as the monomer (B).

Such a fluorine-containing monomer may, for example, be a monomer of the formula (IV):

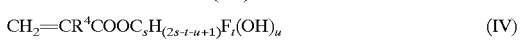

wherein $R^4$ is a hydrogen atom or a methyl group, s is an integer of from 1 to 15, t is a integer of from 1 to (2s+1), and u is an integer of from 0 to 2.

Typical examples of the monomer of the above formula (IV) include 2,2,2-trifluoroethyl (meth)acrylate, 2,2,3,3-tetrafluoropropyl (meth)acrylate, 2,2,3,3-tetrafluoro-t-pentyl (meth)acrylate, 2,2,3,4,4,4-hexafluorobutyl (meth)acrylate, 2,2,3,4,4,4-hexafluoro-t-hexyl (meth)acrylate, 2,3,4,5,5,5-hexafluoro-2,4-bis(trifluoromethyl)pentyl (meth)acrylate, 2,2,3,3,4,4-hexafluorobutyl (meth)acrylate, 2,2,2,2',2',2'-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,5-nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8,8,9,9,10,10,11,11,11-nonadecafluoroundecyl (meth)acrylate, 3,3,4,4,5,5,6,6,7,7,8,8,9,9,10,10,11,11,12,12-eicosafluorododecyl (meth)acrylate, 2-hydroxy-4,4,5,5,6,7,7,7-octafluoro-6-trifluoromethylheptyl (meth)acrylate, 2-hydroxy-4,4,5,6,6,7,7,8,9,9,9-dodecafluoro-8-trifluoromethylnonyl (meth)acrylate and 2-hydroxy-4,4,5,5,6,6,7,7,8,8,9,9,10,11,11,11-hexadecafluoro-10-trifluoromethylundecyl (meth)acrylate. Among the above fluorine-containing monomers, 2,2,2-trifluoroethyl (meth)acrylate and 2,2,2,2',2',2'-hexafluoroisopropyl (meth)acrylate are particularly preferred, since they have large effects for improving the deposit resistance of the resulting ocular lens material.

The above fluorine-containing monomers may be used alone or in combination as a mixture of two or more of them. The amount of such a fluorine-containing monomer may suitably be adjusted depending upon the nature of the desired ocular lens material.

Further, to impart hardness or softness by adjusting the hardness of the resulting ocular lens material, a hardness-adjusting monomer such as an alkyl (meth)acrylate or an alkyl styrene which is a polymerizable compound having an alkyl group, or styrene, may, for example, be used as the monomer (B).

The above alkyl (meth)acrylate may, for example, be a linear, branched or cyclic alkyl (meth)acrylate, such as methyl (meth)acrylate, ethyl (meth)acrylate, isopropyl (meth)acrylate, n-propyl (meth)acrylate, isobutyl (meth)acrylate, n-butyl (meth)acrylate, 2-ethylhexyl (meth)acrylate, n-octyl (meth)acrylate, n-decyl (meth)acrylate, n-dodecyl (meth)acrylate, t-butyl (meth)acrylate, pentyl (meth)acrylate, t-pentyl (meth)acrylate, hexyl (meth)acrylate, heptyl (meth)acrylate, nonyl (meth)acrylate, stearyl (meth)acrylate, cyclopentyl (meth)acrylate or cyclohexyl (meth)acrylate; an alkoxyalkyl (meth)acrylate such as 2-ethoxyethyl (meth)acrylate, 3-ethoxypropyl (meth)acrylate, 2-methoxyethyl (meth)acrylate or 3-methoxypropyl (meth)acrylate; or an alkylthioalkyl (meth)acrylate such as ethylthioethyl (meth)acrylate or methylthioethyl (meth)acrylate.

The above alkyl styrene may, for example, be α-methyl styrene; an alkyl styrene such as methyl styrene, ethyl styrene, propyl styrene, butyl styrene, t-butyl styrene, isobutyl styrene or pentyl styrene; or an alkyl α-methyl styrene such as methyl-α-methyl styrene, ethyl-α-methyl styrene, propyl-α-methyl styrene, butyl-α-methyl styrene, t-butyl-α-methyl styrene, isobutyl-α-methyl styrene or pentyl-α-methyl styrene.

When it is desired to obtain, for example, a soft contact lens, it is preferred to employ, among such hardness-adjusting monomers, the one which, when formed into a homopolymer, will have a glass transition temperature (hereinafter referred to as Tg) of at most 40° C. Further, when it is desired to obtain a hard contact lens, it is preferred to employ the one which, when formed into a homopolymer, will have a Tg of higher than 40° C. Among them, an alkyl (meth)acrylate and an alkyl styrene are particularly preferred, since they are excellent in compatibility or copolymerizability with other polymerizable components.

The above hardness-adjusting monomers may be used alone or in combination as a mixture of two or more of them. The amount of such a hardness-adjusting monomer may suitably be adjusted depending upon the nature of the desired ocular lens material.

Further, to impart ultraviolet absorptivity to the resulting ocular lens material or to color the ocular lens material, a polymerizable ultraviolet absorber, a polymerizable dyestuff or a polymerizable ultraviolet absorbing dyestuff may, for example, be used as the monomer (B).

Specific examples of the polymerizable ultraviolet absorber include benzophenone type polymerizable ultraviolet absorbers such as 2-hydroxy-4-(meth)acryloyloxybenzophenone, 2-hydroxy-4-(meth)acryloyloxy-5-tert-butylbenzophenone, 2-hydroxy-4-(meth)acryloyloxy-2',4'-dichlorobenzophenone and 2-hydroxy-4-(2'-hydroxy-3'-(meth)acryloyloxypropoxy)benzophenone; benzotriazole type polymerizable ultraviolet absorbers such as 2-(2'-hydroxy-5'-(meth)acryloyloxyethylphenyl)-2H-benzotriazole, 2-(2'-hydroxy-5'-(meth)acryloyloxyethylphenyl)-5-chloro-2H-benzotriazole, 2-(2'-hydroxy-5'-(meth)acryloyloxypropylphenyl)-2H-benzotriazole and 2-(2'-hydroxy-5'-(meth)acryloyloxypropyl-3'-tert-butylphenyl)-5-chloro-2H-benzotriazole; salicylic acid derivative-type polymerizable ultraviolet absorbers such as phenyl 2-hydorxy-4-(meth)acryloyloxymethylbenzoate; and other polymerizable ultraviolet absorbers such as methyl 2-cyano-3-phenyl-3-(3'-(meth)acryloyloxyphenyl)propenoate. These polymerizable ultraviolet absorbers may be used alone or in combination as a mixture of two or more of them.

Specific examples of the polymerizable dyestuff include azo type polymerizable dyestuffs such as 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1-(α-anthrylazo)-2-hydroxy-3-(meth)acryloyloxynaphthalene, 1-((4'-(phenylazo)phenyl)azo)-2-hydroxy-3-(meth)acryloyloxynaphthalene, 1-(2',4'-xylylazo)-2-(meth)acryloyloxynaphthalene, 1-(o-tolylazo)-2-(meth)acryloyloxynaphthalene, 2-(m-(meth)acryloylamide-anilino)-4,6-bis(1'-(o-tolylazo)-2'-naphthylamino)-1,3,5-triazine, 2-(m-vinylanilino)-4-((4'-nitrophenylazo)-anilino)-6-chloro-1,3,5-triazine, 2-(1'-(o-tolylazo)-2'-naphthyloxy-4-(m-vinylanilino)-6-chloro-1,3,5-triazine, 2-(p-vinylanilino)-4-(1'-(o-tolylazo)-2'-naphthylamino)-6-chloro-1,3,5-triazine, N-(1'-(o-tolylazo)-2'-naphthyl)-3-vinylphthalic acid monoamide, N-(1'-(o-tolylazo)-2'-naphthyl)-6-vinylphthalic acid monoamide, 3-vinylphthalic acid-(4'-(p-sulfophenylazo)-1'-naphthyl)monoester, 6-vinylphthalic acid-(4'-(p-sulfophenylazo)-1'-naphthyl)monoester, 3-(meth)acryloylamide-4-phenylazophenol, 3-(meth)acryloylamide-4-(8'-hydroxy-3', 6'-disulfo-1'-naphthylazo)

phenol, 3-(meth)acryloylamide-4-(1'-phenylazo-2'-naphthylazo)phenol, 3-(meth)acryloylamide-4-(p-tolylazo)phenol, 2-amino-4-(m-(2'-hydroxy-1'-naphthylazo)anilino)-6-isopropenyl-1,3,5-triazine, 2-amino-4-(N-methyl-p-(2'-hydroxy-1'-naphthylazo)anilino)-6-isopropenyl-1,3,5-triazine, 2-amino-4-(m-(4'-hydroxy-1'-phenylazo)anilino)-6-isopropenyl-1,3,5-triazine, 2-amino-4-(N-methyl-p-(4'-hydroxyphenylazo)anilino)-6-isopropenyl-1,3,5-triazine, 2-amino-4-(m-(3'-methyl-1'-phenyl-5'-hydroxy-4'-pyrazolylazo)anilino) -6-isopropenyl-1,3,5-triazine, 2-amino-4-(N-methyl-p-(3'-methyl-1'-phenyl-5'-hydroxy-4'-pyrazolylazo)anilino)-6-isopropenyl-1,3,5-triazine, 2-amino-4-(p-phenylazoanilino)-6-isopropenyl-1,3,5-triazine and 4-phenylazo-7-(meth)acryloylamide-1-naphthol; anthraquinone type polymerizable dyestuffs such as 1,5-bis((meth)acryloylamino)-9,10-anthraquinone, 1-(4'-vinylbenzoylamide)-9,10-anthraquinone, 4-amino-1-(4'-vinylbenzoylamide)-9,10-anthraquinone, 5-amino-1-(4'-vinylbenzoylamide)-9,10-anthraquinone, 8-amino-1-(4'-vinylbenzoylamide)-9,10-anthraquinone, 4-nitro-1-(4'-vinylbenzoylamide)-9,10-anthraquinone, 4-hydroxy-1-(4'-vinylbenzoylamide)-9,10-anthraquinone, 1-(3'-vinylbenzoylamide)-9,10-anthraquinone, 1-(2'-vinylbenzoylamide)-9,10-anthraquinone, 1-(4'-isopropenylbenzoylamide)-9,10-anthraquinone, 1-(3'-isopropenylbenzoylamide)-9,10-anthraquinone, 1-(2'-isopropenylbenzoylamide)-9,10-anthraquinone, 1,4-bis-(4'-vinylbenzoylamide)-9,10-anthraquinone, 1,4-bis-(4'-isopropenylbenzoylamide)-9,10-anthraquinone, 1,5-bis-(4'-vinylbenzoylamide)-9,10-anthraquinone, 1,5-bis-(4'-isopropenylbenzoylamide)-9,10-anthraquinone, 1-methylamino-4-(3'-vinylbenzoylamide)-9,10-anthraquinone, 1-methylamino-4-(4'-vinylbenzoyloxyethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2-sulfonic acid, 1-amino-4-(3'-(meth)acryloylaminophenylamino)-9,10-anthraquinone-2 -sulfonic acid, 1-amino-4-(3'-(meth)acryloylaminobenzylamino)-9,10-anthraquinone -2-sulfonic acid, 1-(β-ethoxycarbonylallylamino)-9,10-anthraquinone, 1-(β-carboxyallylamino)-9,10-anthraquinone, 1,5-di-(β-carboxyallylamino)-9,10-anthraquinone, 1-(β-isopropoxycarbonylallylamino)-5-benzoylamide-9,10-anthraquinone, 2-(3'-(meth)acryloylamide-anilino)-4-(3'-(3"-sulfo-4"-aminoanthraquinon -1"-yl)amino-anilino)-6-chloro-1,3,5-triazine, 2-(3'-(meth)acryloylamide-anilino)-4-(3'-(3"-sulfo-4"-aminoanthraquinon -1"-yl)amino-anilino)-6-hydrazino-1,3,5-triazine, 2,4-bis-((4"-methoxyanthraquinon-1"-yl)amino)-6-(3'-vinylanilino) -1,3, 5-triazine and 2-(2'-vinylphenoxy)-4-(4'-(3"-sulfo -4"-aminoanthraquinon-1"-yl-amino)anilino)-6-chloro-1,3,5-triazine; nitro type polymerizable dyestuffs such as o-nitroanilinomethyl (meth)acrylate; and phthalocyanine type polymerizable dyestuffs such as (meth)acryloyl-modified tetraamino copper phthalocyanine and (meth)acryloyl-modified (dodecanoyl-modified tetraamino copper phthalocyanine). These polymerizable dyestuffs may be used alone or in combination as a mixture of two or more of them.

Specific examples of the polymerizable ultraviolet absorbing dyestuff include benzophenone type polymerizable ultraviolet absorbing dyestuffs such as 2,4-dihydroxy-3-(p-styrenoazo)benzophenone, 2,4-dihydroxy-5-(p-styrenoazo)benzophenone, 2,4-dihydroxy-3-(p-(meth)acryloyloxymethylphenylazo)benzophenone, 2,4-dihydroxy-5-(p-(meth)acryloyloxymethylphenylazo)-benzophenone, 2,4-dihydroxy-3-(p-(meth)acryloyloxyethylphenylazo)benzophenone, 2,4-dihydroxy-5-(p-(meth)acryloyloxyethylphenylazo)-benzophenone, 2,4-dihydroxy-3-(p-(meth)acryloyloxypropylphenylazo)benzophenone, 2,4-dihydroxy-5-(p-(meth)acryloyloxypropylphenylazo)-benzophenone, 2,4-dihydroxy-3-(o-(meth)acryloyloxymethylphenylazo)benzophenone, 2,4-dihydroxy-5-(o-(meth)acryloyloxymethylphenylazo)-benzophenone, 2,4-dihydroxy-3-(o-(meth)acryloyloxyethylphenylazo)benzophenone, 2,4-dihydroxy-5-(o-(meth)acryloyloxyethylphenylazo)-benzophenone, 2,4-dihydroxy-3-(o-(meth)acryloyloxypropylphenylazo)benzophenone, 2,4-dihydroxy-5-(o-(meth)acryloyloxypropylphenylazo)-benzophenone, 2,4-dihydroxy-3-(p-(N,N-di(meth)acryloyloxyethylamino)phenylazo)benzophenone, 2,4-dihydroxy-5-(p-(N,N-di(meth)acryloyloxyethylamino)phenylazo)benzophenone, 2,4-dihydroxy-3-(o-(N,N-di(meth)acryloyloxyethylamino)phenylazo)benzophenone, 2,4-dihydroxy-5-(o-(N,N-di(meth)acryloylethylamino)phenylazo)benzophenone, 2,4-dihydroxy-3-(p-(N-ethyl-N-(meth)acryloyloxyethylamino)phenylazo)benzophenone, 2,4-dihydroxy-5-(p-(N-ethyl-N-(meth)acryloyloxyethylamino)phenylazo)benzophenone, 2,4-dihydroxy-3-(o-(N-ethyl-N-(meth)acryloyloxyethylamino)phenylazo)benzophenone, 2,4-dihydroxy-5-(o-(N-ethyl-N-(meth)acryloyloxyethylamino)phenylazo)benzophenone, 2,4-dihydroxy-3-(p-(N-ethyl-N-(meth)acryloylamino)phenylazo)benzophenone, 2,4-dihydroxy-5-(p-(N-ethyl-N-(meth)acryloylamino)phenylazo)benzophenone, 2,4-dihydroxy-3-(o-(N-ethyl-N-(meth)acryloylamino)phenylazo)benzophenone and 2,4-dihydroxy-5-(o-(N-ethyl-N-(meth)acryloylamino)phenylazo)benzophenone; and benzoic acid type polymerizable ultraviolet absorbing dyestuffs such as phenyl 2-hydroxy-4-(p-styrenoazo)benzoate.

These polymerizable ultraviolet absorbing dyestuffs may be used alone or in combination as a mixture of two or more of them. The amount of the above polymerizable ultraviolet absorber, polymerizable dyestuff and polymerizable ultraviolet absorbing dyestuff, may suitably be adjusted depending upon the nature of the desired ocular lens material. However, it is advisable to take it into account that the amount is substantially influenced by the thickness of the lens. Their amount is preferably at most 3 wt %, more preferably from 0.1 to 2 wt %, to avoid deterioration of the physical properties of the ocular lens material, such as mechanical strength, or in consideration of the compatibility with living tissues to avoid a possibility that an excessive amount will be unsuitable as a material for ocular lenses such as contact lenses which are in direct contact with living tissues or intraocular lenses embedded in living bodies. Further, particularly in the case of a dyestuff, if the amount is too much, the color of the lens tends to be so deep that the transparency decreases, and visible rays tend to be hardly transmitted through the lens.

In the present invention, among the above monomers (B), one or more monomers other than polysiloxane macromonomers, may be selected and formed into a macromonomer, which may then be incorporated, as one of the monomers (B), to the polymerizable components.

The polymerizable components comprising the above monomer (A) and the optional monomer (B), are suitably adjusted and subjected to polymerization depending upon the use of the desired ocular lens such as a contact lens or an intraocular lens.

In the present invention, the polymerization can be carried out by a conventional method by adjusting the amounts of the polymerizable components comprising the monomer (A) and the optional monomer (B) within the ranges of the above-mentioned respective amounts and adding a radical polymerization initiator thereto, to obtain a polymer.

The conventional method is, for example, a method wherein a radial polymerization initiator is added, followed by gradual heating within a temperature range of from room temperature to about 130° C. or by irradiation of an electromagnetic wave such as a microwave, ultraviolet rays or a radiation (such as γ-rays). In the case of heat polymerization, the temperature may be raised stepwise. The polymerization may be carried out by a bulk polymerization method or a solution polymerization method employing e.g. a solvent, or by other methods.

Typical examples of the above-mentioned radical polymerization initiator include azobisisobutyronitrile, azobisodimethylvaleronitrile, benzoyl peroxide, t-butyl hydroperoxide and cumene hydroperoxide. These initiators may be used alone or in combination as a mixture of two or more of them.

In a case where the polymerization is carried out by means of e.g. light rays, it is preferred to further incorporate a photopolymerization initiator or a sensitizer. The amount of such a photopolymerization initiator or a sensitizer is usually from 0.001 to 2 parts by weight, preferably from 0.01 to 1 part by weight, per 100 parts by weight of the total amount of the polymerizable components.

To shape the ocular lens material into an ocular lens such as a contact lens or an intraocular lens, conventional shaping methods which are commonly used in this field can be employed. Such conventional methods include, for example, a cutting method and a cast molding method. The cutting method is method wherein, after carrying out polymerization in a suitable mold or container to obtain a base material (polymer) of a rod, block or plate shape, such a base material is processed into a desired shape by mechanical processing such as cutting, grinding or polishing. The cast molding method is a method wherein a mold corresponding to the shape of a desired ocular lens, is prepared, and polymerization of the above-mentioned polymerizable components is carried out in this mold to obtain a molded product, which may further be subjected to mechanical finishing as the case requires.

When it is desired to obtain the ocular lens material of the present invention as a soft material at a temperature around room temperature and such a material is shaped into an ocular lens, it is usually preferred to employ a cast molding method as the shaping method. Such a casting method may, for example, be a spin casting method or a static casting method.

Apart from these methods, a method may preferably be applied to the present invention wherein a monomer capable of forming a hard polymer is impregnated to a soft ocular lens material, followed by polymerization of the monomer to harden the entire material, which is then subjected to cutting, grinding and polishing to obtain a shaped product having a desired shape, and then the hard polymer is removed from the shaped product to obtain a shaped final product (an ocular lens) made of the soft material (JP-A-62-2780241, JP-A-1-11854).

Further, to prepare an intraocular lens, the lens and the support for the lens may separately be prepared, and they may be later bonded to each other. Otherwise, the support portion may be simultaneously (integrally) molded with the lens.

Now, the ocular lens material of the present invention will be described in further detail with reference to Examples. However, it should be understood that the present invention is by no means restricted to such specific Examples.

EXAMPLES 1 to 5 and COMPARATIVE EXAMPLES 1 and 2

The polymerizable components identified in Table 1 and 0.02 part by weight of 2,2'-azobis(2,4-dimethylvaleronitrile as a polymerization initiator, were uniformly mixed to obtain a transparent solution. This solution was injected into a glass test tube having an inner diameter of 15 mm. An oxygen scavenger was attached, and the test tube was then sealed.

Then, the sealed test tube was transferred to a circulation system constant temperature water tank, whereupon polymerization was carried out at 30° C. for 40 hours and at 50° C. for 8 hours. The test tube was transferred to a circulation system drier and heated within a temperature range of from 60° to 120° C. while gradually raising the temperature over a period of about 16 hours, to complete the polymerization to obtain a rod-shaped polymer having a diameter of about 15 mm.

The obtained rod-shaped polymer was cut into a desired thickness and subjected to cutting, grinding and polishing to obtain a test specimen. As the physical properties of this test specimen, the appearance (transparency), the refractive index, the contact angle and the Shore D hardness were measured in accordance with the following methods. The results are shown in Table 1.

(a) Appearance (transparency)

The test specimen having a thickness of 4 mm was visually inspected and evaluated in accordance with the following evaluation standards.

Evaluation standards

○: Colorless transparent

X: Turbidity observed (b) Refractive index

Using Atago refractometer 1T (manufactured by Kabushiki Kaisha Atago), the refractive index (no unit) of the test specimen having a thickness of 4 mm was measured at a temperature of 25° C. under a relative humidity of 50%.

(c) Contact angle

Using a goniometer, the contact angle (degree) of the dried test specimen having a thickness of 4 mm was measured by a bubble method at a temperature of 25° C.

(d) Shore D hardness

Using a Shore D type hardness meter GS-720G (manufactured by Kabushiki Kaisha Techloc), the Shore D hardness (no unit) of the test specimen having a thickness of 4 mm and a diameter of 12.7 mm was measured at a temperature of 25° C. under a relative humidity of 50%.

In Table 1, the abbreviations of polymerizable components are as follows.

(A)-1: 2-Phthaloyloxyethyl methacrylate of the formula:

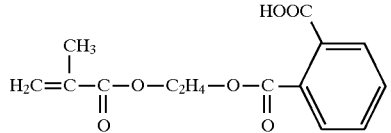

(A)-2: 2-Hexahydrophthaloyloxyethyl methacrylate of the formula:

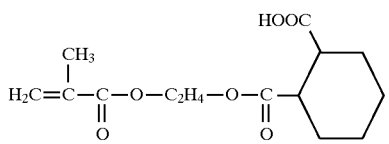

MMA: Methyl methacrylate
SiSt: Tris(trimethylsiloxy)silylstyrene
EDMA: Ethylene glycol dimethacrylate
VBMA: Vinyl benzyl methacrylate

TABLE 1

| | Polymerizable components | | | | | | Physical properties of the test specimen | | | |
| --- | --- | --- | --- | --- | --- | --- | --- | --- | --- | --- |
| | (parts by weight) | | | | | | | Refractive | Contact | Shore D |
| Example | Monomer (A) | | Monomer (B) | | | | Appearance | index | angle | hardness |
| Nos. | (A)-1 | (A)-2 | MMA | SiSt | EDMA | VBMA | (transparency) | (no unit) | (degree) | (no unit) |
| 1 | 50 | — | 50 | — | 1 | — | ○ | 1.525 | <20 | 95 |
| 2 | — | 50 | 50 | — | 1 | — | ○ | 1.503 | 40 | 94 |
| 3 | 20 | — | 80 | — | 1 | — | ○ | 1.506 | <20 | 94 |
| 4 | — | 20 | 80 | — | 1 | — | ○ | 1.497 | 45 | 94 |
| 5 | 10 | — | 60 | 30 | — | 1 | ○ | 1.489 | 32 | 88 |
| Comparative Example 1 | — | — | 100 | — | 1 | — | ○ | 1.490 | 59 | 94 |
| Comparative Example 2 | — | — | 70 | 30 | — | 1 | ○ | 1.478 | 53 | 84 |

From the results shown in Table 1, it is evident that the test specimens obtained in Examples 1 to 5 are all excellent in transparency. Further, from the comparison between the test specimens of Examples 1 to 4 wherein a monomer (A) was used and the test specimen of Comparative Example 1 wherein a monomer (B) (MMA) was used alone, and from the comparison between the test specimen of Example 5 wherein a monomer (A) was used and the test specimen of Comparative Example 2 wherein monomers (B) (MMA and SiSt) were used alone, it is evident that the test specimens of the respective Examples have high hardness equal or superior to the test specimens of the corresponding Comparative Examples while they have higher refractive indices, and they have small contact angles, thus indicating excellent surface wettability.

As described in the foregoing, the ocular lens material of the present invention is excellent in surface wettability and transparency and has high refractive index, and yet it has a relatively high hardness.

Accordingly, the ocular lens material of the present invention is useful for e.g. contact lenses or intraocular lenses.

What is claimed is:

1. An ocular lens material made of a polymer obtained by polymerizing polymerizable components comprising a monomer of the formula (I):

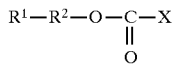   (I)

wherein $R^1$ is a group of the formula:

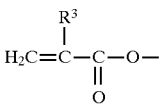

wherein $R^3$ is a hydrogen atom or a methyl group, or a group of the formula:

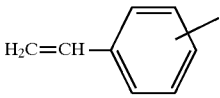

$R^2$ is a $C_{1-5}$ alkylene group, and X is a group of the formula

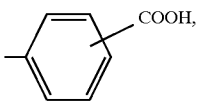

a group of the formula

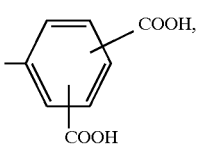

a group of the formula

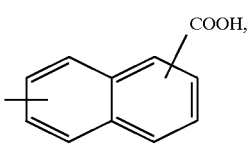

or a group of the formula

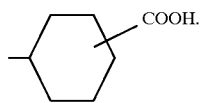

2. The ocular lens material according to claim 1, wherein the monomer of the formula (I) is in an amount of at least 3 wt % of the polymerizable components.

3. The ocular lens material according to claim 1, wherein the polymerizable components contain a monomer having an unsaturated double bond copolymerizable with the monomer of the formula (I).

4. The ocular lens material according to claim 3, wherein the monomer having an unsaturated double bond copolymerizable with the monomer of the formula (I) is a crosslinkable monomer.

* * * * *

UNITED STATES PATENT AND TRADEMARK OFFICE
CERTIFICATE OF CORRECTION

PATENT NO.  : 5,811,502
DATED       : September 22, 1998
INVENTOR(S) : Haruyuki HIRATANI It is certified that error appears in the above-identified patent and that said Letters Patent is hereby corrected as shown below:

On the title page, item [30], Foreign Application Priority Data has been omitted. It should be:

--[30]  Foreign Application Priority Data
     Nov. 18, 1996 [JP] Japan ............ 8-306482--

Signed and Sealed this

Seventh Day of September, 1999

Attest:

Q. TODD DICKINSON

Attesting Officer    Acting Commissioner of Patents and Trademarks